US009625989B2

(12) United States Patent
Wilson et al.

(10) Patent No.: US 9,625,989 B2
(45) Date of Patent: Apr. 18, 2017

(54) HEAD MOUNTED DISPLAY

(71) Applicant: FOVE, Inc., San Mateo, CA (US)

(72) Inventors: Lochlainn Wilson, Tokyo (JP); Bakui Chou, Tokyo (JP); Keiichi Seko, Tokyo (JP)

(73) Assignee: FOVE, Inc., San Mateo, CA (US)

( * ) Notice: Subject to any disclaimer, the term of this patent is extended or adjusted under 35 U.S.C. 154(b) by 0 days.

(21) Appl. No.: 14/907,999

(22) PCT Filed: Apr. 1, 2015

(86) PCT No.: PCT/JP2015/060398
§ 371 (c)(1),
(2) Date: Jan. 27, 2016

(87) PCT Pub. No.: WO2016/157486
PCT Pub. Date: Oct. 6, 2016

(65) Prior Publication Data
US 2017/0038834 A1 Feb. 9, 2017

(51) Int. Cl.
*G06F 3/01* (2006.01)
*H04N 5/225* (2006.01)
(Continued)

(52) U.S. Cl.
CPC ........... *G06F 3/013* (2013.01); *G02B 17/086* (2013.01); *G02B 19/0028* (2013.01); *G06K 9/0061* (2013.01); *G06K 9/00604* (2013.01); *G06K 9/4661* (2013.01); *G06T 7/0042* (2013.01); *H04N 5/2254* (2013.01); *H04N 5/33* (2013.01);
(Continued)

(58) Field of Classification Search
CPC combination set(s) only.
See application file for complete search history.

(56) References Cited

U.S. PATENT DOCUMENTS

| 3,936,605 A | 2/1976 | Upton | |
|---|---|---|---|
| 4,181,405 A * | 1/1980 | Cohen | G02B 27/0172 2/6.2 |

(Continued)

FOREIGN PATENT DOCUMENTS

| JP | 2-264632 A | 10/1990 |
|---|---|---|
| JP | 11-73274 A | 3/1999 |

OTHER PUBLICATIONS

Written Opinion of the International Searching Authority dated Jun. 16, 2015 of corresponding International Application No. PCT/JP2015/060398 along with an English translation.

*Primary Examiner* — Van Chow
(74) *Attorney, Agent, or Firm* — DLA Piper LLP (US)

(57) ABSTRACT

A head mounted display is used in a state of being mounted on a user's head and includes a convex lens disposed at a position facing the user's cornea when the head mounted display is mounted. An infrared light source emits infrared light toward the convex lens. A camera captures an image including the user's cornea in a subject. A housing houses the convex lens, the infrared light source, and the camera. The convex lens is provided with a plurality of reflection regions that reflects infrared light in an inside of the convex lens. The infrared light source causes a pattern of infrared light to appear on the user's cornea by emitting infrared light to each of the plurality of reflection regions provided in the convex lens.

12 Claims, 8 Drawing Sheets

(51) Int. Cl.
  *H04N 5/33*  (2006.01)
  *H04N 13/04*  (2006.01)
  *H04N 13/02*  (2006.01)
  *G06K 9/00*  (2006.01)
  *G06T 7/00*  (2017.01)
  *G06K 9/46*  (2006.01)
  *G02B 17/08*  (2006.01)
  *G02B 19/00*  (2006.01)

(52) U.S. Cl.
  CPC ......... *H04N 13/02* (2013.01); *H04N 13/0429* (2013.01); *G02B 19/009* (2013.01); *G06K 2009/4666* (2013.01); *G06T 2207/30196* (2013.01)

(56) References Cited

U.S. PATENT DOCUMENTS

| | | | |
|---|---|---|---|
| 6,204,974 B1 * | 3/2001 | Spitzer | G02C 7/086 |
| | | | 359/630 |
| 6,353,503 B1 * | 3/2002 | Spitzer | G02B 27/0172 |
| | | | 359/630 |
| 6,426,740 B1 | 7/2002 | Goto et al. | |
| 8,337,015 B2 * | 12/2012 | Sugihara | G02B 27/0172 |
| | | | 345/7 |
| 2014/0160157 A1 | 6/2014 | Poulos et al. | |

\* cited by examiner

– 1 –

HEAD MOUNTED DISPLAY

TECHNICAL FIELD

This disclosure relates to a head mounted display.

BACKGROUND

A technique is known in which the eyesight direction of a user is detected by emitting non-visible light such as near-infrared light to the user's eyes, and analyzing an image of the user's eyes including reflected light. Information of the detected eyesight direction of the user is reflected on the monitor of, for example, a PC (Personal Computer), a game console or the like, and thus use as a pointing device has been realized.

A head mounted display is an image display device that presents a three-dimensional image to a user wearing the device. Generally, the head mounted display is used in a state of being mounted to cover the visual range of a user. For this reason, a user wearing the head mounted display has an external image shielded. When the head mounted display is used as a display device of an image of a moving picture, a game or the like, it is difficult for a user to visually recognize an input device such as a controller.

Therefore, the usability of a head mounted display as a substitute for a pointing device by detecting the eyesight direction of a user wearing the display is of convenience. Particularly, the acquisition of geometric information (information of spatial coordinates or a shape) of a user's cornea in a state where the user wears a head mounted display is useful in estimating the eyesight direction of the user.

It could therefore be helpful to provide a technique of detecting geometric information of the cornea of a user wearing a head mounted display.

SUMMARY

We provide a head mounted display used in a state of being mounted on a user's head including a convex lens disposed at a position facing a user's cornea when the head mounted display is mounted; an infrared light source that emits infrared light toward the convex lens; a camera that captures an image including the user's cornea in a subject; and a housing that houses the convex lens, the infrared light source, and the camera, wherein the convex lens is provided with a plurality of reflection regions that reflect infrared light in an inside of the convex lens, and the infrared light source causes a pattern of infrared light to appear on the user's cornea by emitting infrared light to each of the plurality of reflection regions provided in the convex lens.

We also provide the head mounted display wherein the convex lens has the plurality of reflection regions formed therein so that the pattern of infrared light appearing on the user's cornea forms structured light.

We further provide the head mounted display wherein the pattern is formed by a plurality of infrared light dots, and the convex lens is provided with the reflection regions so that a different dot pattern appears at a different position of the user's cornea.

We further provide the head mounted display wherein the camera is a stereo camera including two or more imaging units.

We yet further provide the head mounted display further including an image output unit that analyzes a pattern of infrared light present in an image captured by the camera, and outputs the image captured by the camera to a cornea coordinate acquisition unit that acquires spatial coordinates of the user's cornea.

We still further provide the head mounted display wherein the image output unit further outputs the image captured by the camera to an eyesight detection unit that detects an eyesight direction of the user.

REFERENCE SIGNS LIST

1: image system, 100: head mounted display, 103: near-infrared light source, 104: LED, 108: image display element, 112: hot mirror, 114: convex lens, 116: camera, 118: image output unit, 120: reflection region, 130: image display system, 150: housing, 160: mounting fixture, 170: headphone, 200: image reproducing device, 210: reception and transmission unit, 220: image generation unit, 230: eyesight detection unit, 240: cornea coordinate acquisition unit

DETAILED DESCRIPTION

We provide a head mounted display used in a state of being mounted on a user's head. The head mounted display includes a convex lens disposed at a position facing the user's cornea when the display is mounted, an infrared light source that emits infrared light toward the convex lens, a camera that captures an image including the user's cornea in a subject, and a housing that houses the convex lens, the infrared light source, and the camera. The convex lens is provided with a plurality of reflection regions that reflect infrared light in an inside of the convex lens, and the infrared light source causes a pattern of infrared light to appear on the user's cornea by emitting infrared light to each of the plurality of reflection regions provided in the convex lens.

The convex lens may have the plurality of reflection regions formed therein so that the pattern of infrared light appearing on the user's cornea forms structured light.

The pattern may be a pattern formed by a plurality of infrared light dots, and the convex lens may be provided with the reflection regions so that a different dot pattern appears at a different position of the user's cornea.

The camera may be a stereo camera including two or more imaging units.

The display may further include an image output unit that analyzes a pattern of infrared light present in an image captured by the camera, and outputs the image captured by the camera to a cornea coordinate acquisition unit that acquires spatial coordinates of the user's cornea.

The image output unit may further output the image captured by the camera to an eyesight detection unit that detects an eyesight direction of the user.

Meanwhile, any combination of the aforementioned components, and implementation of our displays in the form of methods, devices, systems, computer programs, data structures, recording mediums, and the like may be considered part of this disclosure.

It is thus possible to provide a technique of detecting geometric information of the cornea of a user wearing a head mounted display.

Figure 1:
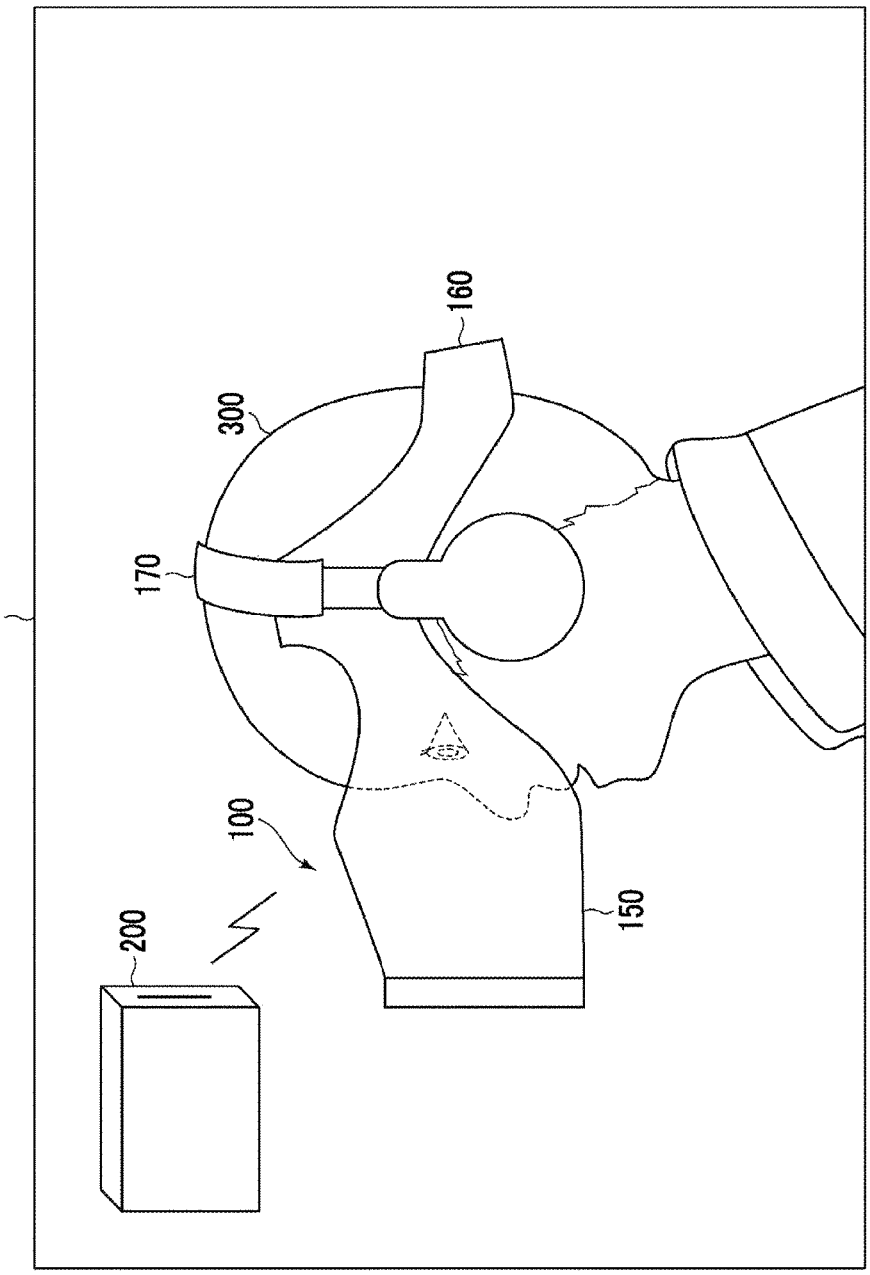
FIG. 1 is a diagram schematically illustrating a general view of an example of our image system.

FIG. 1 is a diagram schematically illustrating a general view of an image system 1 according to an example. The image system 1 includes a head mounted display 100 and an image reproducing device 200. As shown in FIG. 1, the head mounted display 100 is used in a state of being mounted on the head of a user 300.

The image reproducing device 200 generates an image displayed by the head mounted display 100. Although not limited, as an example, the image reproducing device 200 is a device capable of reproducing an image of a stationary game console, a portable game console, a PC, a tablet, a smartphone, a phablet, a video player, a television or the like. The image reproducing device 200 connects to the head mounted display 100 in a wireless or wired manner. In an example shown in FIG. 1, the image reproducing device 200 is wirelessly connected to the head mounted display 100. The wireless connection of the image reproducing device 200 to the head mounted display 100 can be realized using, for example, a wireless communication technique such as known WI-FI (Registered Trademark) or BLUETOOTH (Registered Trademark). Although not limited, as an example, transmission of an image between the head mounted display 100 and the image reproducing device 200 is executed according to the standard of MIRACAST (Trademark), WIGIG (Trademark), WHDI (Trademark), or the like.

Meanwhile, FIG. 1 illustrates an example when the head mounted display 100 and the image reproducing device 200 are different devices. However, the image reproducing device 200 may be built into the head mounted display 100.

The head mounted display 100 includes a housing 150, a mounting fixture 160, and a headphone 170. The housing 150 houses an image display system such as an image display element that presents an image to the user 300, or a wireless transmission module such as a WI-FI module or a BLUETOOTH (Registered Trademark) module which is not shown. The mounting fixture 160 mounts the head mounted display 100 on the head of the user 300. The mounting fixture 160 can be realized by, for example, a belt, an elastic band or the like. When the user 300 mounts the head mounted display 100 using the mounting fixture 160, the housing 150 is disposed at a position where the eyes of the user 300 are covered. For this reason, when the user 300 mounts the head mounted display 100, the visual range of the user 300 is shielded by the housing 150.

The headphone 170 outputs a voice of an image reproduced by the image reproducing device 200. The headphone 170 may be fixed to the head mounted display 100. Even in a state where the user 300 mounts the head mounted display 100 using the mounting fixture 160, the user can freely attach and detach the headphone 170.

Figure 2:
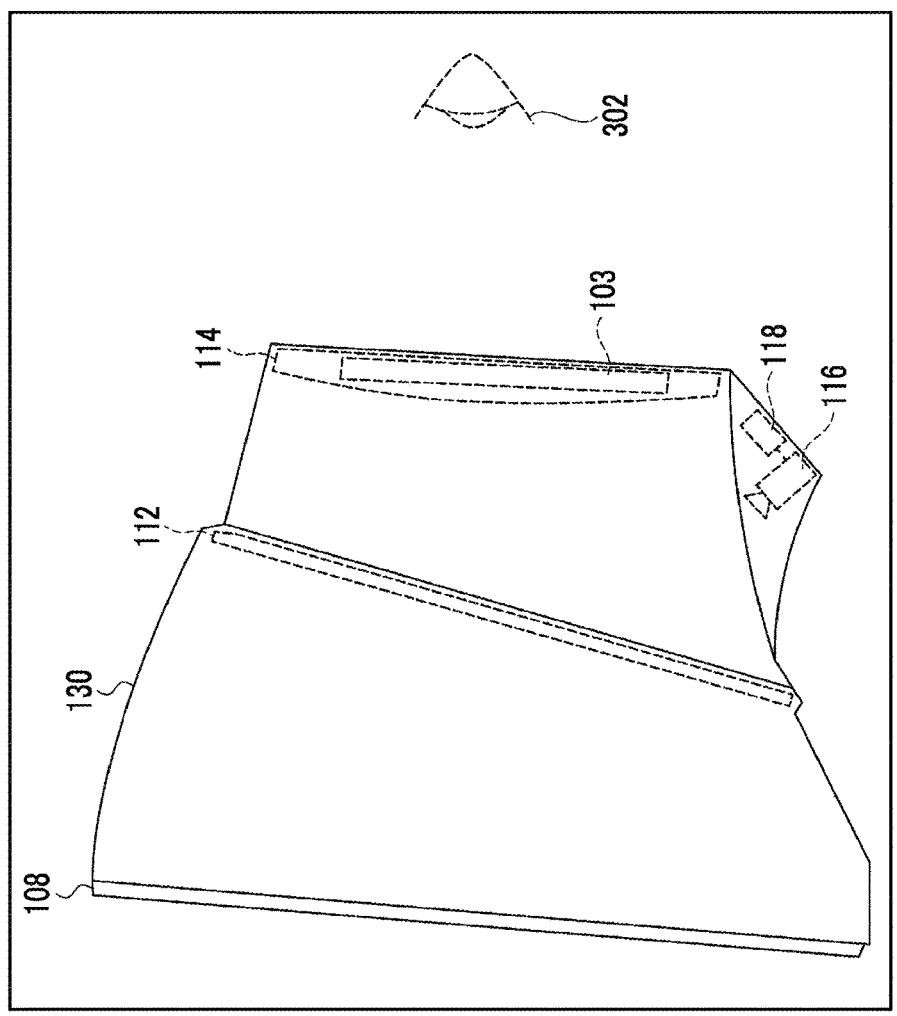
FIG. 2 is a diagram schematically illustrating an optical configuration of an image display system housed by a housing.

FIG. 2 is a diagram schematically illustrating an optical configuration of an image display system 130 housed by the housing 150. The image display system 130 includes a near-infrared light source 103, an image display element 108, a hot mirror 112, a convex lens 114, a camera 116, and an image output unit 118.

The near-infrared light source 103 is a light source capable of emitting light of a near-infrared (approximately 700 nm to 2,500 nm) wavelength band. The near-infrared light is light of a wavelength band of non-visible light which is not able to be generally observed with a naked eye of the user 300.

The image display element 108 displays an image for presentation to the user 300. The image displayed by the image display element 108 is generated by a GPU (Graphic Processing Unit), not shown, within the image reproducing device 200. The image display element 108 can be realized using, for example, a known LCD (Liquid Crystal Display), an organic EL display (Organic Electro-Luminescent Display) or the like.

When the user 300 mounts the head mounted display 100, the hot mirror 112 is disposed between the image display element 108 and the cornea 302 of the user 300. The hot mirror 112 has a property of transmitting visible light generated by the image display element 108, but reflecting near-infrared light.

The convex lens 114 is disposed on the opposite side to the image display element 108 with respect to the hot mirror 112. In other words, when the user 300 mounts the head mounted display 100, the convex lens 114 is disposed between the hot mirror 112 and the cornea 302 of the user 300. That is, when the head mounted display 100 is mounted to the user 300, the convex lens 114 is disposed at a position facing the cornea 302 of the user 300.

The convex lens 114 condenses image display light that passes through the hot mirror 112. For this reason, the convex lens 114 functions as an image enlargement unit that enlarges an image generated by the image display element 108 and presents the enlarged image to the user 300. Meanwhile, for convenience of description, only one convex lens 114 is shown in FIG. 2, but the convex lens 114 may be a lens group configured by combining various lenses, and may be configured such that one lens has a curvature and the other lens is a planar one-sided convex lens.

The near-infrared light source 103 is disposed at the lateral side of the convex lens 114. The near-infrared light source 103 emits infrared light toward the inside of the convex lens 114. The convex lens 114 is provided with a plurality of reflection regions that reflect the infrared light inside the lens. These reflection regions can be realized by providing fine regions having different refractive indexes in the inside of the convex lens 114. Meanwhile, providing the regions having different refractive indexes in the convex lens 114 can be realized using a known laser machining technique. The reflection region is provided at a plurality of places in the inside of the convex lens 114.

Near-infrared light emitted toward the inside of the convex lens 114 by the near-infrared light source 103 is reflected from the reflection region inside the convex lens 114 and directed to the cornea 302 of the user 300. Meanwhile, since the near-infrared light is non-visible light, the user 300 is almost not able to perceive the near-infrared light reflected from the reflection region. In addition, the reflection region is a region which is as large as a pixel constituting the image display element 108 or is finer. For this reason, the user 300 is almost not able to perceive the reflection region, and is able to observe image light emitted by the image display element 108. Meanwhile, the details of the reflection region will be described later.

Although not shown, the image display system 130 of the head mounted display 100 includes two image display elements 108, and can generate an image for presentation to the right eye of the user 300 and an image for presentation to the left eye independently of each other. For this reason, the head mounted display 100 can present a parallax image for the right eye and a parallax image for the left eye, respectively, to the right eye and the left eye of the user 300. Thereby, the head mounted display 100 can present a stereoscopic image having a sense of depth to the user 300.

As described above, the hot mirror 112 transmits visible light, and reflects near-infrared light. Therefore, image light emitted by the image display element 108 passes through the hot mirror 112 and reaches the cornea 302 of the user 300. In addition, infrared light emitted from the near-infrared light source 103 and reflected from the reflection region inside the convex lens 114 reaches the cornea 302 of the user 300.

The infrared light reaching the cornea 302 of the user 300 is reflected from the cornea 302 of the user 300, and directed to the direction of the convex lens 114 again. This infrared light passes through the convex lens 114, and is reflected from the hot mirror 112. The camera 116 includes a filter that shields visible light, and captures near-infrared light reflected from the hot mirror 112. That is, the camera 116 is a near-infrared camera that captures near-infrared light emitted from the near-infrared light source 103 and reflected from the cornea of the user 300.

The image output unit 118 outputs an image captured by the camera 116 to an eyesight detection unit that detects the eyesight direction of the user 300. The image output unit 118 also outputs the image captured by the camera 116 to a cornea coordinate acquisition unit that acquires spatial coordinates of the user's cornea. Specifically, the image output unit 118 transmits the image captured by the camera 116 to the image reproducing device 200. The eyesight detection unit and the cornea coordinate acquisition unit will be described later, but can be realized by an eyesight detecting program and a cornea coordinate acquiring program executed by a CPU (Central Processing Unit) of the image reproducing device 200. Meanwhile, when the head mounted display 100 has a computing resource of a CPU, a memory or the like, the CPU of the head mounted display 100 may execute a program to operate the eyesight detection unit.

Although a detailed description will be given later, in the image captured by the camera 116, a bright point of the near-infrared light reflected by the cornea 302 of the user 300 and an image of the eye including the cornea 302 of the user 300 observed at a near-infrared wavelength band are captured.

In the convex lens 114, a plurality of reflection regions are formed so that a pattern of infrared light appearing on the cornea 302 of the user 300 forms structured light. The "structured light" refers to light used in one method of three-dimensional measurement of an object called a structured light method. More specifically, the structured light is light emitted to cause a light pattern having a special structure to appear on the surface of an object to be measured. Various patterns caused to appear through the structured light are present, but include as an example, a plurality of dot patterns arrayed in a lattice shape, stripe-shaped patterns disposed at equal intervals, a lattice pattern, and the like. In addition, the structured light may include not only single-color light, but also multi-color (such as, for example, red, green and blue) light.

The structured light method is a known technique, and thus a detailed description thereof will not be given, but the structured light formed by the reflection region provided inside the convex lens 114 causes a pattern formed by a plurality of infrared light dots to appear in a region including the cornea 302 of the user 300.

Figure 3B:
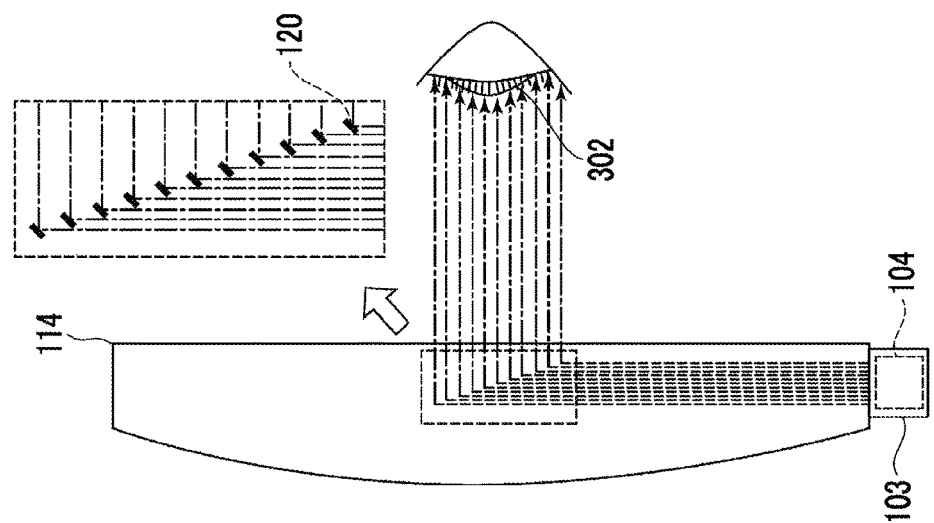
FIGS. 3(a) and 3(b) are schematic diagrams illustrating a reflection region.
Figure 3A:
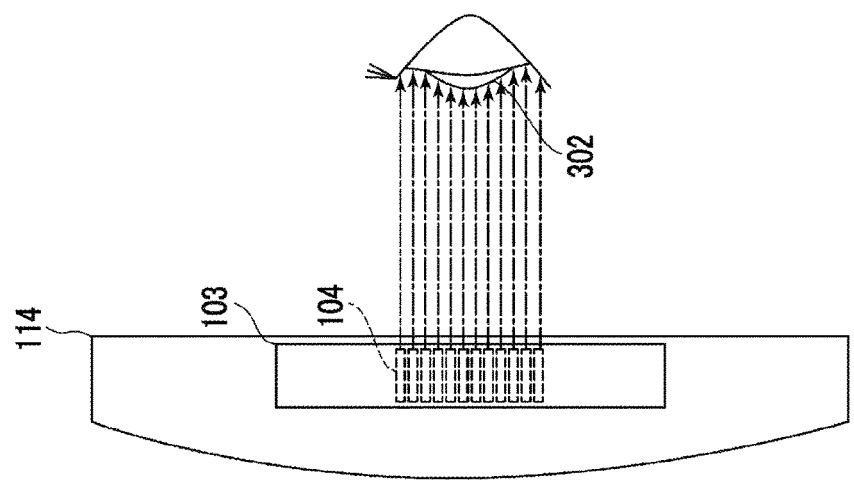

FIGS. 3(*a*) and 3(*b*) are schematic diagrams illustrating reflection regions 120. FIG. 3(*a*) is a diagram illustrating when the convex lens 114 is seen from the lateral side (outer canthus of the user 300), and FIG. 3(*b*) is a diagram illustrating when the convex lens 114 is seen from the upper side (top of the head of the user 300).

As shown in FIG. 3(*a*), the near-infrared light source 103 includes a plurality of LEDs 104. To avoid becoming complicated, in FIG. 3(*a*), only one reference numeral 104 is shown, but the rectangles of broken lines indicate the LEDs 104. The LED 104 emits infrared light toward the inside of the convex lens 114.

As shown in FIG. 3(*b*), a plurality of reflection regions 120 are provided inside the convex lens 114. To avoid becoming complicated, in FIG. 3(*b*), only one reference numeral 120 is shown, but regions shown by diagonal segments in the drawing indicate the reflection regions 120.

As described above, the reflection region 120 is a region having a different refractive index as compared to other regions in the convex lens 114. For this reason, the infrared light incident from the LED 104 is totally reflected from the reflection region 120 and directed to the cornea 302 of the user 300. Since the reflection region 120 is provided in a plurality of places in the convex lens 114, as much infrared light as the reflection region 120 is directed to the cornea 302 of the user 300. Thereby, dot patterns according to an installation shape of the reflection region 120 can be formed on the cornea 302 of the user 300. Meanwhile, providing a region having a refractive index in the convex lens 114 can be realized using a known laser machining technique.

As described above, the infrared light reaching the cornea 302 of the user 300 is reflected from the cornea 302 of the user 300, and directed to the direction of the convex lens 114 again. In this case, when the infrared light reaches the reflection region 120, the infrared light is reflected by the reflection region 120 and is not able to pass through the convex lens 114. However, each of the reflection regions 120 is a narrow region, and a relative position between the reflection region 120 and the cornea 302 of the user 300 continually changes with a change in the eyesight of the user 300. For this reason, the probability of the infrared light reflected from the cornea 302 of the user 300 and directed to the convex lens 114 being reflected by the reflection region 120 is small, which does not lead to a problem.

Even when it is assumed that the infrared light reflected from the cornea 302 of the user 300 and directed to the convex lens 114 is reflected in the reflection region 120 at a certain timing, the relative position between the reflection region 120 and the cornea 302 of the user 300 changes at another timing, and thus the infrared light is not reflected. Therefore, even when reflected light from the cornea 302 of the user 300 is reflected by the reflection region 120 at a certain moment by capturing the infrared light in the camera 116 over time, the camera 116 can capture an image at another moment, which does not lead to a problem.

FIG. 3(*b*) illustrates the reflection regions 120 present in a certain horizontal cross section of the convex lens 114. The reflection regions 120 are also present on other horizontal cross sections of the convex lens 114. Therefore, the infrared light emitted from the near-infrared light source 103 and reflected by the reflection region 120 is distributed two-dimensionally in the cornea 302 of the user 300 and forms dot patterns.

Figure 4A:
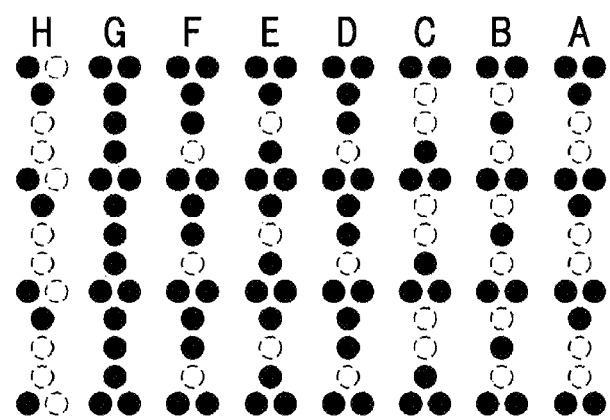
FIGS. 4(a) and 4(b) are diagrams schematically illustrating an example of dot patterns generated by a reflection region of a convex lens.
Figure 4B:
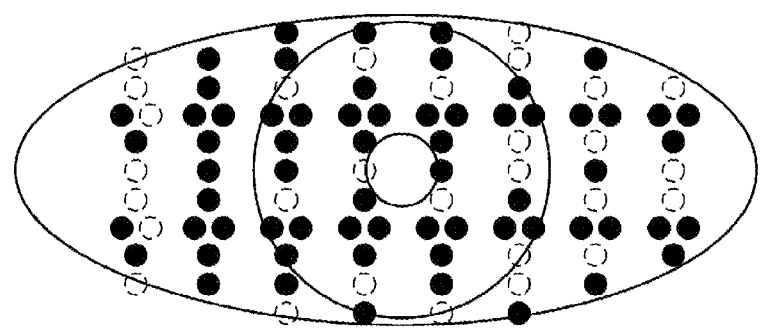

FIGS. 4(a) and 4(b) are diagrams schematically illustrating an example of dot patterns generated by the reflection region 120 of the convex lens 114. More specifically, FIG. 4(a) is a schematic diagram illustrating dot patterns emitted from the convex lens 114. Meanwhile, in the drawing shown in FIG. 4(a), A to H are symbols shown for convenience to describe the lineup of dots, and are not dot patterns caused to appear in reality.

In FIG. 4(a), black circles and white circles are lined up in a longitudinal direction at equal intervals. Meanwhile, the longitudinal direction in FIG. 4 is a direction linking the top of the head of the user to the chin, and is a vertical direction when the user stands upright. Hereinafter, a dot row longitudinally lined up from the symbol A may be described as a row A. The same is true of the symbols B to H.

In FIG. 4(a), the black circle indicates that a dot (bright point) caused by infrared light appears, and the white circle indicates that a dot does not appear in reality. In the convex lens 114, a reflection region is provided so that a different dot pattern appears at a different position of the cornea 302 of the user 300. In an example shown in FIG. 4(a), all the dot rows are formed as different dot patterns from the row A to the row H. Therefore, the cornea coordinate acquisition unit can uniquely specify each dot row by analyzing dot patterns in an image captured by the camera 116.

FIG. 4(b) is a schematic diagram illustrating dot patterns reflected from a region including the cornea 302 of the user 300, and is a diagram schematically illustrating an image captured by the camera 116. As shown in FIG. 4(b), the dot patterns captured by the camera 116 are dot patterns mainly reaching the ocular surface of the user 300, and dot patterns reaching the skin of the user 300 have a tendency to be captured. This is because the dot patterns reaching the skin of the user 300 are diffusely reflected from the skin, and the amount of light reaching the camera 116 is reduced. On the other hand, dot patterns reaching the ocular surface of the user 300 are subject to reflection close to specular reflection due to the influence of tears or the like. For this reason, the amount of light of the dot patterns reaching the camera 116 also increases.

Figure 5:
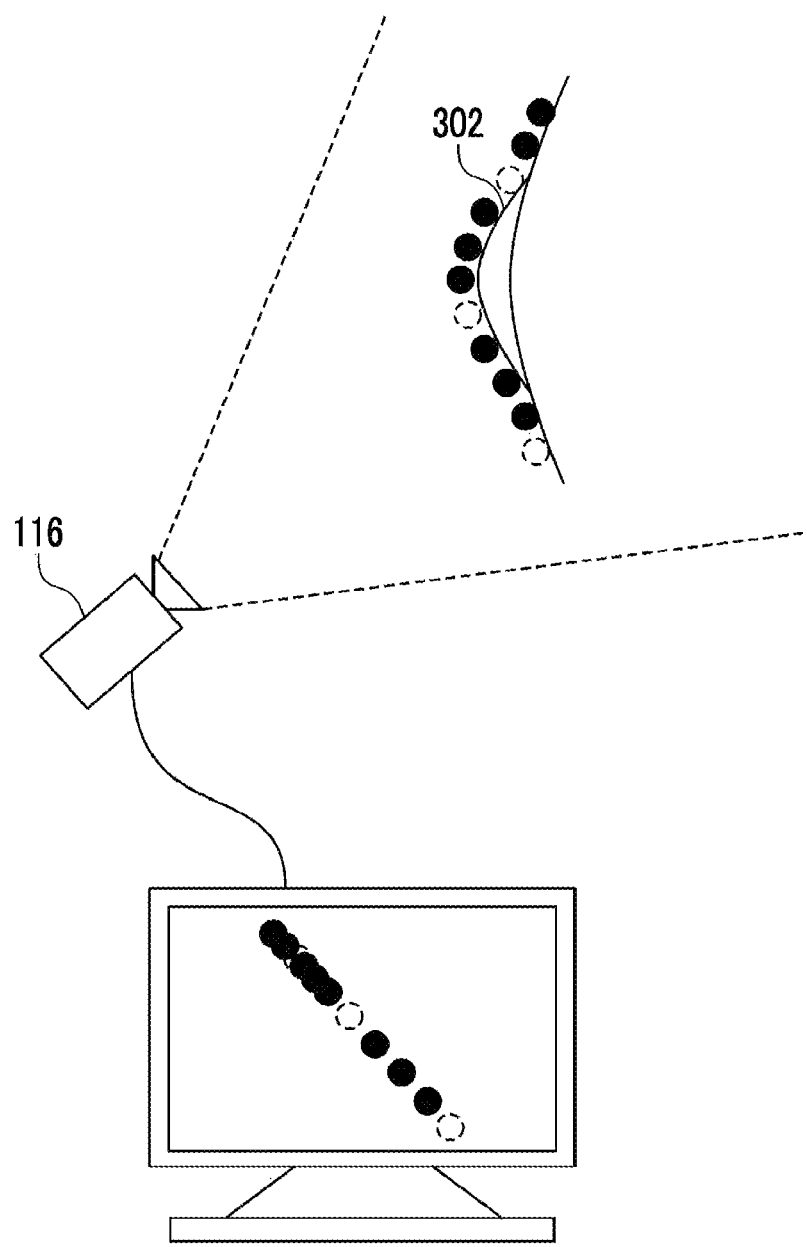
FIG. 5 is a schematic diagram illustrating a relationship between a captured dot pattern and a structure of a subject.

FIG. 5 is a schematic diagram illustrating a relationship between a captured dot pattern and a structure of a subject. An example shown in FIG. 5 shows a state where the row D in FIG. 4(a) is captured.

As shown in FIG. 5, the camera 116 captures the cornea 302 of the user 300 from a downward direction (that is, direction of the user's mouth). Generally, the human cornea has a shape protruding in an eyesight direction. For this reason, even when equally-spaced dot patterns appear in the cornea 302 of the user 300, an interval between each of the dots in the dot pattern captured by the camera 116 changes depending on the shape of the cornea 302 of the user 300. In other words, an interval between the dot patterns appearing in the cornea 302 of the user 300 reflects information in a depth direction (that is, direction in which the infrared light is emitted to the cornea 302 of the user 300). This interval between the dot patterns is analyzed, and thus the cornea coordinate acquisition unit can acquire the shape of the cornea 302 of the user 300. Meanwhile, the above is not limited to when the camera 116 captures the cornea 302 of the user 300 from the downward direction. Light paths of infrared light incident on the cornea 302 of the user 300 and infrared light reflected from the cornea 302 of the user 300 may shift from each other, and the camera 116 may capture, for example, the cornea 302 of the user 300 from a transverse direction or an upward direction.

Figure 6:
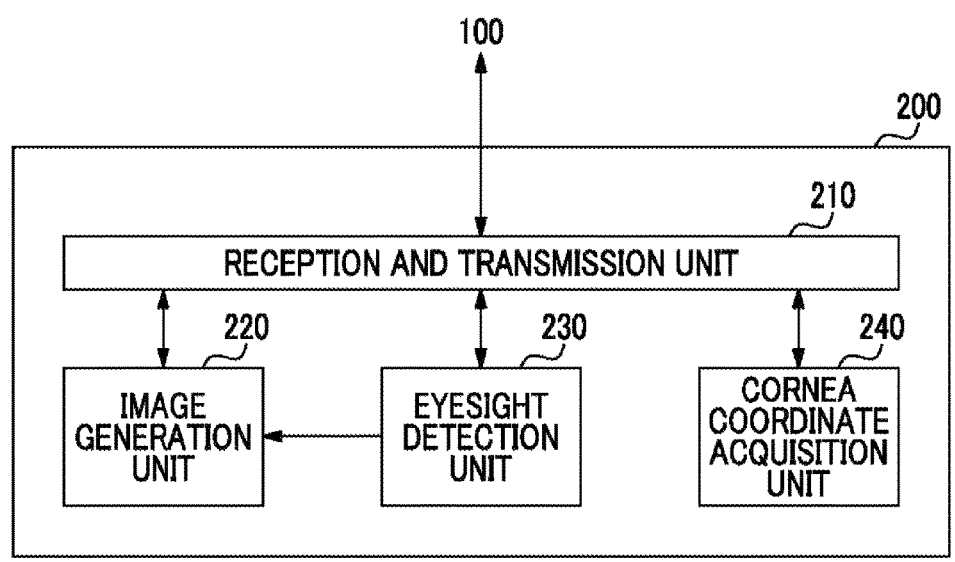
FIG. 6 is a diagram schematically illustrating a functional configuration of an image reproducing device.

FIG. 6 is a diagram schematically illustrating a functional configuration of the image reproducing device 200. The image reproducing device 200 includes a reception and transmission unit 210, an image generation unit 220, an eyesight detection unit 230, and a cornea coordinate acquisition unit 240.

FIG. 6 illustrates a functional configuration to operate an image generation process, an eyesight detection process, and a cornea coordinate detection process performed by the image reproducing device 200, and other configurations are omitted. In FIG. 6, each component described as functional blocks that perform various processes can be constituted by a CPU (Central Processing Unit), a main memory, and other LSIs (Large Scale Integrations) in a hardware manner. In addition, each component is realized by programs or the like loaded into the main memory in a software manner. Meanwhile, the programs may be stored in a computer readable recording medium, and may be downloaded from a network through a communication line. It is understood by those skilled in the art that these functional blocks can be realized in various forms by hardware only, software only, or a combination thereof, and are not limited to any particular one.

The reception and transmission unit 210 executes the transmission of information between the image reproducing device 200 and the head mounted display 100. The reception and transmission unit 210 can be realized by a wireless communication module according to the standard of MIRACAST (Trademark), WIGIG (Trademark), WHDI (Trademark), or the like described above.

The image generation unit 220 generates an image displayed on the image display element 108 of the head mounted display 100. The image generation unit 220 can be realized using, for example, the GPU or the CPU described above.

The cornea coordinate acquisition unit 240 analyzes the interval between the dot patterns appearing in the cornea 302 of the user 300, and thus acquires a three-dimensional shape of the cornea 302 of the user 300. Thereby, the cornea coordinate acquisition unit 240 can also estimate position coordinates of the cornea 302 of the user 300 in a three-dimensional coordinate system using the camera 116 as an origin.

Meanwhile, the camera 116 may be a monocular camera, and may be a stereo camera including two or more imaging units. In this case, the cornea coordinate acquisition unit 240 analyzes the parallax image of the cornea 302 of the user 300 which is captured by the camera 116, and thus can more accurately estimate the position coordinates of the cornea 302 of the user 300 in the three-dimensional coordinate system using the camera 116 as an origin.

Figure 7:
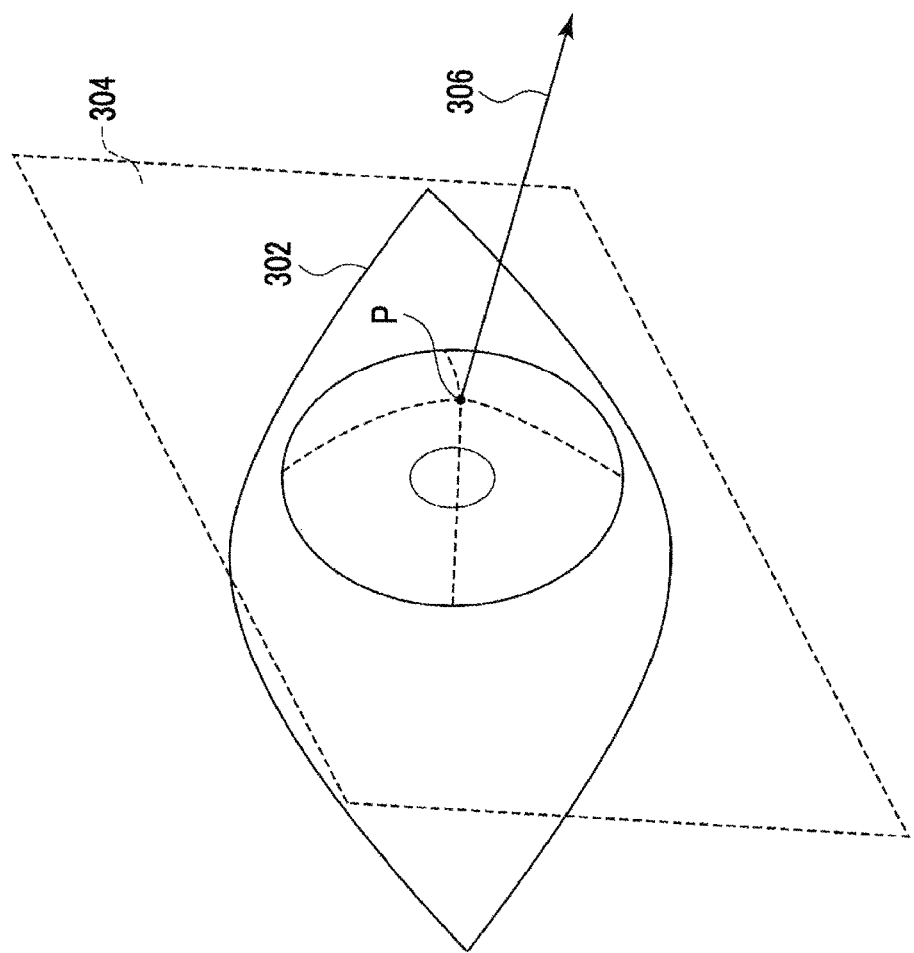
FIG. 7 is a schematic diagram illustrating an eyesight direction of a user.

FIG. 7 is a schematic diagram illustrating an eyesight direction of the user 300. As described above, the dot patterns appearing in the cornea 302 are analyzed, and thus the cornea coordinate acquisition unit 240 can acquire the shape of the cornea 302 of the user 300. Thereby, as shown in FIG. 6, the eyesight detection unit 230 can detect a peak P of the cornea 302 of the user 300 having an approximately hemisphere shape. Subsequently, the eyesight detection unit 230 sets a plane 304 that comes into contact with the cornea 302 at the peak P. In this case, the direction of a normal line 306 of the plane 304 at the peak P is set to the eyesight direction of the user 300.

Meanwhile, the cornea 302 of the user 300 is generally aspherical rather than spherical. For this reason, in the above method in which the cornea 302 of the user 300 is assumed to be spherical, an estimation error may occur in the eyesight direction of the user 300. Consequently, the eyesight detection unit 230 may provide calibration for an eyesight direction estimation in advance of the user 300 starting to use the head mounted display 100.

Figure 8:
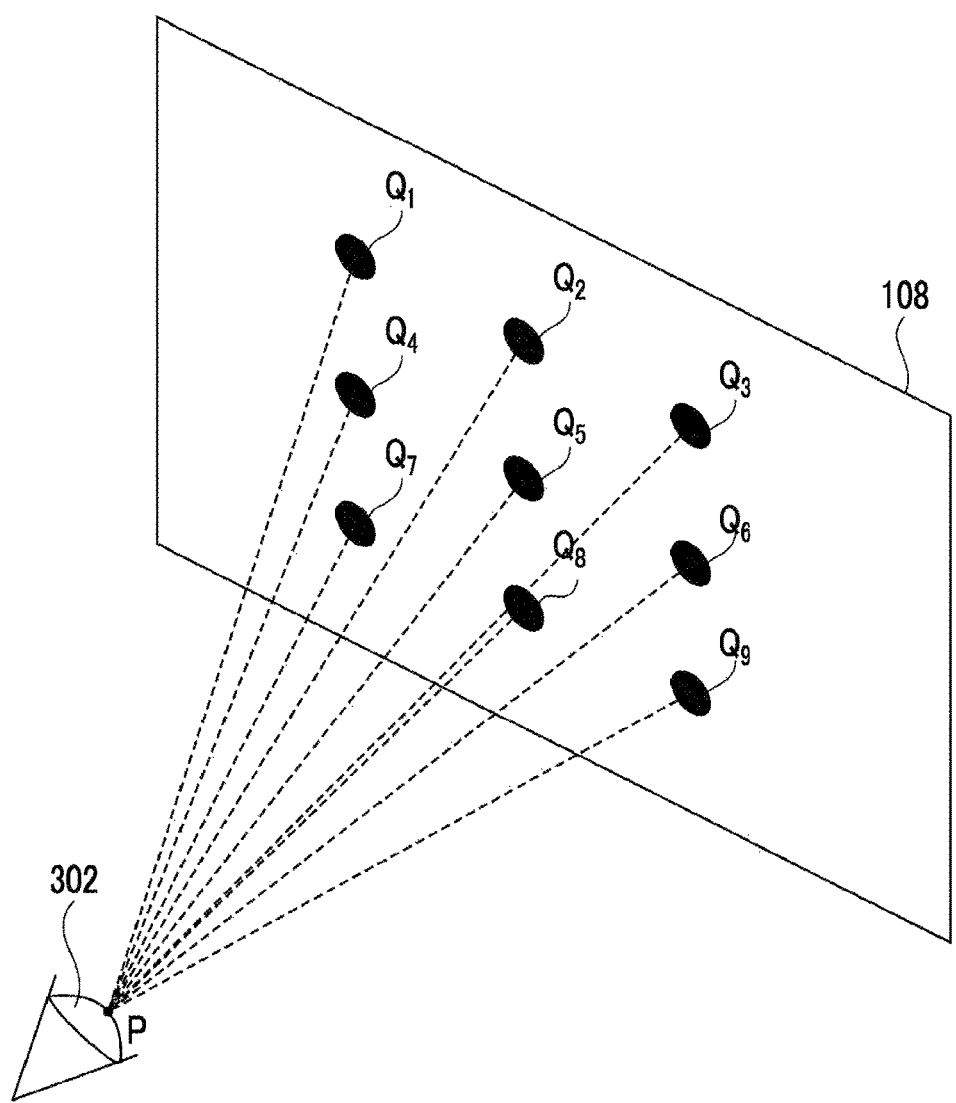
FIG. 8 is a schematic diagram illustrating calibration in an eyesight direction which is executed by a head mounted display.

FIG. 8 is a schematic diagram illustrating calibration in an eyesight direction executed by the eyesight detection unit 230. The eyesight detection unit 230 generates nine points from points $Q_1$ to $Q_9$ as shown in FIG. 8 in the image generation unit 220, and displays these points on the image display element 108. The eyesight detection unit 230 causes the user 300 to keep observation on these points in order from the point $Q_1$ to the point $Q_9$, and detects the aforementioned normal line 306. In addition, when the user 300 keeps observation on, for example, the point $Q_1$, the central coordinates (that is, coordinates of the peak P described above with reference to FIG. 7) of the cornea 302 of the user 300 are set to $P_1$. In this case, the eyesight direction of the user 300 is set to a direction $P_1$-$Q_1$ linking the point P1 to the point $Q_1$ in FIG. 8. The eyesight detection unit 230 compares the acquired direction of the normal line 306 with the direction $P_1$-$Q_1$, and stores the error thereof.

Hereinafter, similarly, the user 300 stores errors with respect to nine directions $P_1$-$Q_1$, $P_2$-$Q_2$, . . . , $P_9$-$Q_9$ of the point $Q_1$ to the point $Q_9$, and thus the eyesight detection unit 230 can acquire a correction table to correct the direction of the normal line 306 obtained by calculation. The eyesight detection unit 230 acquires the correction table in advance through calibration, and corrects the direction of the normal line 306 obtained in the aforementioned method, thereby allowing higher-accuracy eyesight direction detection to be realized.

It is also considered that, after the user 300 mounts the head mounted display 100 on the head and the eyesight detection unit 230 performs calibration, a relative positional relationship between the head of the user 300 and the head mounted display 100 changes. However, when the eyesight direction of the user 300 is detected from the shape of the cornea 302 of the user 300 described above, the relative positional relationship between the head of the user 300 and the head mounted display 100 does not influence the accuracy of detection of the eyesight direction. Therefore, it is possible to realize robust eyesight direction detection with respect to a change in the relative positional relationship between the head of the user 300 and the head mounted display 100.

Regarding the above, a method in which the eyesight detection unit 230 detects the eyesight direction of the user 300 using a geometric method has been described. The eyesight detection unit 230 may execute eyesight direction detection based on an algebraic method using coordinate transformation described below, instead of the geometric method.

In FIG. 8, the coordinates of the point $Q_1$ to the point $Q_9$ in the two-dimensional coordinate system which is set in a moving image displayed by the image display element 108 are set to $Q_1(x_1, y_1)^T$, $Q_2(x_2, y_2)^T$ . . . , $Q_9(x_9, x_9)^T$, respectively. In addition, the coordinates of the position coordinates $P_1$ to $P_9$ of the cornea 302 of the user 300 when the user 300 keeps observation on the point $Q_1$ to the point $Q_9$ are set to $P_1(X_1, Y_1, Z_1)^T$, $P_2(X_2, Y_2, Z_2)^T$, . . . , $P_9(Z_9, Y_9, Z_9)^T$, respectively. Meanwhile, T indicates the transposition of a vector or a matrix.

A matrix M having a size of 3×2 is defined as Expression (1).

$$M = \begin{pmatrix} m_{11} & m_{12} & m_{13} \\ m_{21} & m_{22} & m_{23} \end{pmatrix} \quad (1)$$

In this case, when the matrix M satisfies Expression (2), the matrix M becomes a matrix to project the eyesight direction of the user 300 onto a moving image surface displayed by the image display element 108.

$$P_N = MQ_N(N=1, \ldots, 9) \quad (2)$$

When Expression (2) is specifically written, Expression (3) is established.

$$\begin{pmatrix} x_1 & x_2 & \ldots & x_9 \\ y_1 & y_2 & \ldots & y_9 \end{pmatrix} = \begin{pmatrix} m_{11} & m_{12} & m_{13} \\ m_{21} & m_{22} & m_{23} \end{pmatrix} \begin{pmatrix} X_1 & X_2 & \ldots & X_9 \\ Y_1 & Y_2 & \ldots & Y_9 \\ Z_1 & Z_2 & \ldots & Z_9 \end{pmatrix} \quad (3)$$

When Expression (3) is deformed, Expression (4) is obtained.

$$\begin{pmatrix} x_1 \\ x_2 \\ \vdots \\ x_9 \\ y_1 \\ y_2 \\ \vdots \\ y_9 \end{pmatrix} = \begin{pmatrix} X_1 & Y_1 & Z_1 & 0 & 0 & 0 \\ X_2 & Y_2 & Z_2 & 0 & 0 & 0 \\ \vdots & \vdots & \vdots & \vdots & \vdots & \vdots \\ X_9 & Y_9 & Z_9 & 0 & 0 & 0 \\ 0 & 0 & 0 & X_1 & Y_1 & Z_1 \\ 0 & 0 & 0 & X_2 & Y_2 & Z_2 \\ \vdots & \vdots & \vdots & \vdots & \vdots & \vdots \\ 0 & 0 & 0 & X_9 & Y_9 & Z_9 \end{pmatrix} \begin{pmatrix} m_{11} \\ m_{12} \\ m_{13} \\ m_{21} \\ m_{22} \\ m_{23} \end{pmatrix} \quad (4)$$

When the following expression is set, Expression (5) is obtained.

$$y = \begin{pmatrix} x_1 \\ x_2 \\ \vdots \\ x_9 \\ y_1 \\ y_2 \\ \vdots \\ y_9 \end{pmatrix}, A == \begin{pmatrix} X_1 & Y_1 & Z_1 & 0 & 0 & 0 \\ X_2 & Y_2 & Z_2 & 0 & 0 & 0 \\ \vdots & \vdots & \vdots & \vdots & \vdots & \vdots \\ X_9 & Y_9 & Z_9 & 0 & 0 & 0 \\ 0 & 0 & 0 & X_1 & Y_1 & Z_1 \\ 0 & 0 & 0 & X_2 & Y_2 & Z_2 \\ \vdots & \vdots & \vdots & \vdots & \vdots & \vdots \\ 0 & 0 & 0 & X_9 & Y_9 & Z_9 \end{pmatrix}, x = \begin{pmatrix} m_{11} \\ m_{12} \\ m_{13} \\ m_{21} \\ m_{22} \\ m_{23} \end{pmatrix} \quad (5)$$

$$y = Ax$$

In Expression (5), the elements of a vector y are the coordinates of the points $Q_1$ to $Q_9$ displayed on the image display element 108 by the eyesight detection unit 230, and thus the elements are known. In addition, the elements of a matrix A are coordinates of the peak P of the cornea 302 of the user 300 acquired by the cornea coordinate acquisition unit 240. Therefore, the eyesight detection unit 230 can acquire the vector y and the matrix A. Meanwhile, a vector x which is a vector obtained by arranging the elements of the transformation matrix M is unknown. Therefore, when the vector y and the matrix A are known, a problem of estimating the matrix M becomes a problem of obtaining the unknown vector x.

In Expression (5), when the number of expressions (that is, the number of points Q presented to the user 300 when the eyesight detection unit 230 performs calibration) is larger than the number of unknowns (that is, the number of elements of the vector x is 6), a priority determination problem occurs. In the example shown in Expression (5), the number of expressions is nine, which leads to a priority determination problem.

An error vector between the vector y and a vector Ax is set to a vector e. That is, the relation of e=y−Ax is established. In this case, in the meaning of minimizing a square sum of the elements of the vector e, an optimum vector $x_{opt}$ is obtained by Expression (6).

$$x_{opt}=(A^T A)^{-1} A^T y \quad (6)$$

wherein "−1" indicates an inverse matrix.

The eyesight detection unit 230 constitutes the matrix M of Expression (1) by using the elements of the obtained vector $x_{opt}$. Thereby, the eyesight detection unit 230 uses the matrix M and the coordinates of the peak P of the cornea 302 of the user 300 acquired by the cornea coordinate acquisition unit 240, and thus can estimate where on the moving image surface displayed by the image display element 108 the user 300 keeps observation on according to Expression (2).

It is also considered that, after the user 300 mounts the head mounted display 100 on the head and the eyesight detection unit 230 performs calibration, a relative positional relationship between the head of the user 300 and the head mounted display 100 changes. However, the position coordinates of the peak P of the cornea 302 constituting the matrix A described above are values estimated by the cornea coordinate acquisition unit 240 as position coordinates in the three-dimensional coordinate system using the camera 116 as an origin. Even when it is assumed that the relative positional relationship between the head of the user 300 and the head mounted display 100 changes, a coordinate system based on the position coordinates of the peak P of the cornea 302 does not change. Therefore, even when the relative positional relationship between the head of the user 300 and the head mounted display 100 changes slightly, coordinate transformation according to Expression (2) is considered to be effective. Consequently, eyesight detection executed by the eyesight detection unit 230 can improve robustness with respect to a shift of the head mounted display 100 during mounting.

As described above, according to the head mounted display 100, it is possible to detect geometric information of the cornea 302 of the user 300 wearing the head mounted display 100.

Particularly, the head mounted display 100 can acquire the three-dimensional shape and the position coordinates of the cornea 302 of the user 300, it is possible to estimate the eyesight direction of the user 300 with good accuracy.

As stated above, our displays have been described on the basis of our examples. The examples have been described for exemplary purposes only, and it can be readily understood by those skilled in the art that various modifications may be made by a combination of each of these components or processes, which are also encompassed by the scope of this disclosure.

In the above, a description has been given of an example when the convex lens 114 is provided with the reflection regions 120 so that different dot patterns appear at different positions of the cornea 302 of the user 300. Dots having different blinking patterns may be caused to appear at different positions of the cornea 302 of the user 300, instead thereof or in addition thereto. This can be realized by forming, for example, the near-infrared light source 103 by a plurality of different light sources, and changing a blinking pattern in each light source.

The invention claimed is:

1. A head mounted display used in a state of being mounted on a user's head comprising:
    a convex lens disposed at a position facing a user's cornea when the head mounted display is mounted;
    an infrared light source that emits infrared light toward the convex lens;
    a camera that captures an image including the user's cornea in a subject; and
    a housing that houses the convex lens, the infrared light source, and the camera,
    wherein the convex lens is provided with a plurality of reflection regions that reflect infrared light in an inside of the convex lens, and
    the infrared light source causes a pattern of infrared light to appear on the user's cornea by emitting infrared light to each of the plurality of reflection regions provided in the convex lens.

2. The head mounted display according to claim 1, wherein the convex lens has the plurality of reflection regions formed therein so that the pattern of infrared light appearing on the user's cornea forms structured light.

3. The head mounted display according to claim 1, wherein the pattern is formed by a plurality of infrared light dots, and
    the convex lens is provided with the reflection regions so that a different dot pattern appears at a different position of the user's cornea.

4. The head mounted display according to claim 1, wherein the camera is a stereo camera including two or more imaging units.

5. The head mounted display according to claim 1, further comprising an image output unit that analyzes a pattern of infrared light present in an image captured by the camera, and outputs the image captured by the camera to a cornea coordinate acquisition unit that acquires spatial coordinates of the user's cornea.

6. The head mounted display according to claim 5, wherein the image output unit further outputs the image captured by the camera to an eyesight detection unit that detects an eyesight direction of the user.

7. The head mounted display according to claim 2, wherein the pattern is formed by a plurality of infrared light dots, and
    the convex lens is provided with the reflection regions so that a different dot pattern appears at a different position of the user's cornea.

8. The head mounted display according to claim 2, wherein the camera is a stereo camera including two or more imaging units.

9. The head mounted display according to claim 3, wherein the camera is a stereo camera including two or more imaging units.

10. The head mounted display according to claim 2, further comprising an image output unit that analyzes a pattern of infrared light present in an image captured by the camera, and outputs the image captured by the camera to a cornea coordinate acquisition unit that acquires spatial coordinates of the user's cornea.

11. The head mounted display according to claim 3, further comprising an image output unit that analyzes a pattern of infrared light present in an image captured by the camera, and outputs the image captured by the camera to a cornea coordinate acquisition unit that acquires spatial coordinates of the user's cornea.

12. The head mounted display according to claim 4, further comprising an image output unit that analyzes a pattern of infrared light present in an image captured by the camera, and outputs the image captured by the camera to a cornea coordinate acquisition unit that acquires spatial coordinates of the user's cornea.

* * * * *